(12) United States Patent
Ji et al.

(10) Patent No.: US 9,131,241 B2
(45) Date of Patent: Sep. 8, 2015

(54) ADJUSTING HARDWARE ACCELERATION FOR VIDEO PLAYBACK BASED ON ERROR DETECTION

(75) Inventors: Gang Ji, Bothell, WA (US); Naveen Thumpudi, Sammamish, WA (US); Shyam Sadhwani, Bellevue, WA (US); Yongjun Wu, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1305 days.

(21) Appl. No.: 12/323,055

(22) Filed: Nov. 25, 2008

(65) Prior Publication Data

US 2010/0128778 A1    May 27, 2010

(51) Int. Cl.
| | |
|---|---|
| H04N 5/85 | (2006.01) |
| H04N 19/42 | (2014.01) |
| H04N 19/61 | (2014.01) |
| H04N 19/44 | (2014.01) |
| H04N 19/89 | (2014.01) |
| H04N 19/93 | (2014.01) |

(52) U.S. Cl.
CPC .............. *H04N 19/42* (2014.11); *H04N 19/44* (2014.11); *H04N 19/61* (2014.11); *H04N 19/89* (2014.11); *H04N 19/93* (2014.11)

(58) Field of Classification Search
USPC .......................................... 375/240.2, 240.27
See application file for complete search history.

(56) References Cited

U.S. PATENT DOCUMENTS

| | | | |
|---|---|---|---|
| 5,475,389 A * | 12/1995 | Song et al. ................... | 341/67 |
| 5,568,200 A | 10/1996 | Pearlstein et al. | |
| 5,650,781 A * | 7/1997 | Park .............................. | 341/67 |
| 5,724,446 A | 3/1998 | Liu et al. | |
| 6,005,982 A | 12/1999 | Abe | |
| 6,151,034 A | 11/2000 | Jain | |
| 6,272,180 B1 | 8/2001 | Lei | |

(Continued)

FOREIGN PATENT DOCUMENTS

| | | |
|---|---|---|
| WO | WO 2006/020019 | 2/2006 |
| WO | WO 2006/111063 | 10/2006 |

(Continued)

OTHER PUBLICATIONS

Chung et al., "DCT Based Error Concealment for RTSP Video Over a Modern Internet Connection," *Proceedings of the 1998 IEEE International Symposium on Circuits and Systems*, 1998, 4 pages.

(Continued)

*Primary Examiner* — Morshed Mehedi
*Assistant Examiner* — Phy Anh Vu
(74) *Attorney, Agent, or Firm* — Bryan Webster; Kate Drakos; Micky Minhas

(57) ABSTRACT

Adjustment of hardware acceleration level in a video decoder utilizing hardware acceleration is described. Errors are detected in a bitstream as it is decoded using different levels of error detection based on decoding characteristics. A statistical analysis is performed on the error values as they are detected. In one technique, if the bitstream is categorized as fitting a high error rate state in a bitstream model, then hardware acceleration is dropped. In another technique, error statistics based on run-lengths of good and bad bitstream units are kept, and compared to predetermined thresholds. If the thresholds are exceeded, the hardware acceleration level is dropped. The level is dropped in order to take advantage of superior error handing abilities of software-based decoding over hardware-accelerated decoding.

19 Claims, 10 Drawing Sheets

Video Decoding with Adjustable Hardware Acceleration

(56) References Cited

U.S. PATENT DOCUMENTS

| | | |
|---|---|---|
| 6,275,239 B1 | 8/2001 | Ezer et al. |
| 6,275,964 B1* | 8/2001 | Nagin et al. ................. 714/746 |
| 6,323,904 B1* | 11/2001 | Knee .......................... 348/425.1 |
| 6,404,817 B1 | 6/2002 | Saha et al. |
| 6,417,910 B1* | 7/2002 | Mead ............................ 352/12 |
| 6,470,049 B1 | 10/2002 | Nguyen |
| 6,522,694 B1 | 2/2003 | Ryan |
| 6,748,020 B1* | 6/2004 | Eifrig et al. ............. 375/240.26 |
| 6,763,192 B1* | 7/2004 | Jagannathan ................... 398/54 |
| 6,993,202 B2* | 1/2006 | Igarashi et al. ............. 382/246 |
| 7,068,722 B2 | 6/2006 | Wells |
| 7,113,542 B2 | 9/2006 | Tanaka |
| 7,149,247 B2 | 12/2006 | Sullivan |
| 7,184,100 B1 | 2/2007 | Wilf et al. |
| 7,496,282 B2 | 2/2009 | Kochale |
| 7,500,240 B2 | 3/2009 | Shoemaker |
| 7,707,334 B2* | 4/2010 | Wang et al. ..................... 710/52 |
| 7,742,532 B2 | 6/2010 | Jeon |
| 7,751,473 B2 | 7/2010 | Hannuksela |
| 7,792,374 B2 | 9/2010 | Ohira |
| 8,300,702 B2 | 10/2012 | Yamazaki |
| 2002/0069038 A1* | 6/2002 | Cooper ......................... 702/191 |
| 2002/0141502 A1 | 10/2002 | Lin et al. |
| 2003/0112333 A1 | 6/2003 | Chen |
| 2003/0156652 A1 | 8/2003 | Wise et al. |
| 2004/0032908 A1* | 2/2004 | Hagai et al. ............. 375/240.25 |
| 2004/0047614 A1 | 3/2004 | Green |
| 2004/0101055 A1 | 5/2004 | Hourunranta |
| 2004/0139462 A1 | 7/2004 | Hannuksela et al. |
| 2004/0185775 A1* | 9/2004 | Bell et al. ..................... 455/12.1 |
| 2004/0190617 A1 | 9/2004 | Shen et al. |
| 2004/0247030 A1 | 12/2004 | Witehoff |
| 2004/0258151 A1 | 12/2004 | Spampinato |
| 2005/0025463 A1* | 2/2005 | Bloom et al. ................... 386/96 |
| 2005/0089104 A1* | 4/2005 | Kim .......................... 375/240.27 |
| 2005/0094729 A1* | 5/2005 | Yuan et al. ............... 375/240.16 |
| 2005/0123057 A1 | 6/2005 | MacInnis et al. |
| 2005/0232359 A1 | 10/2005 | Cha |
| 2005/0278502 A1 | 12/2005 | Hundley |
| 2006/0002479 A1 | 1/2006 | Fernandes |
| 2006/0013318 A1 | 1/2006 | Webb et al. |
| 2006/0039475 A1 | 2/2006 | Liu et al. |
| 2006/0045190 A1 | 3/2006 | Sun et al. |
| 2006/0059510 A1* | 3/2006 | Huang et al. ..................... 725/32 |
| 2006/0062304 A1 | 3/2006 | Hsia |
| 2006/0088107 A1 | 4/2006 | Cancemi et al. |
| 2006/0098732 A1 | 5/2006 | Bruna et al. |
| 2006/0104366 A1 | 5/2006 | Huang et al. |
| 2006/0133770 A1 | 6/2006 | Shibata et al. |
| 2006/0146940 A1 | 7/2006 | Gomila et al. |
| 2006/0233239 A1 | 10/2006 | Sethi et al. |
| 2006/0251177 A1 | 11/2006 | Webb |
| 2007/0014359 A1 | 1/2007 | Gomila et al. |
| 2007/0030911 A1 | 2/2007 | Yoon |
| 2007/0033494 A1 | 2/2007 | Wenger et al. |
| 2007/0073779 A1 | 3/2007 | Walker et al. |
| 2007/0086526 A1 | 4/2007 | Koto et al. |
| 2007/0091997 A1 | 4/2007 | Fogg et al. |
| 2007/0098080 A1 | 5/2007 | Diard et al. |
| 2007/0116128 A1 | 5/2007 | Evans |
| 2007/0118544 A1* | 5/2007 | Lundquist et al. ............ 707/101 |
| 2007/0136779 A1* | 6/2007 | Tsushima .................... 725/131 |
| 2007/0153898 A1 | 7/2007 | Yim |
| 2007/0177678 A1 | 8/2007 | Subramania et al. |
| 2007/0211055 A1 | 9/2007 | Stein |
| 2007/0223595 A1 | 9/2007 | Hannuksela |
| 2007/0242080 A1 | 10/2007 | Hamada |
| 2008/0002773 A1 | 1/2008 | Lai |
| 2008/0049844 A1 | 2/2008 | Liu et al. |
| 2008/0049845 A1 | 2/2008 | Liu |
| 2008/0107184 A1 | 5/2008 | Katsavounidis et al. |
| 2008/0130754 A1 | 6/2008 | Winger |
| 2009/0052858 A1 | 2/2009 | Date |
| 2009/0074075 A1 | 3/2009 | Au |
| 2012/0147956 A1 | 6/2012 | Katsavounidis et al. |
| 2013/0077690 A1 | 3/2013 | Wei et al. |

FOREIGN PATENT DOCUMENTS

| | | |
|---|---|---|
| WO | WO 2006/111915 | 10/2006 |
| WO | WO 2006/134110 | 12/2006 |

OTHER PUBLICATIONS

Fiedler, "Implementation of a Basic H.264/AVC Decoder," Chemnitz University of Technology, Faculty of Computer Science, Seminar Paper, Jun. 1, 2004, 28 pages.

"H.264/MPEG-4 AVC," Wikipedia, visited May 27, 2009, 8 pages.

ISO/IEC, "Text of ISO/IEC 14496-10:2005/FPDAM3 Scalable Video Coding (in Integrated Form with ISO/IEC 14996-10)," ISO/IEC JTC 1/SC 29/WG 11 N8241 (Jul. 2006), 552 pages.

Lee et al., "Error-Resilient Image Coding (ERIC) with Smart-IDCT Error Concealment Technique for Wireless Multimedia Transmission," *IEEE Transactions on Circuits and Systems for Video Technology*, vol. 13, No. 2, Feb. 2003, pp. 176-181.

Marpe, "The H.264/MPEG4 Advanced Video Coding Standard and Its Applications," *IEEE Communications Magazine*, Standards Report, Aug. 2006, 10 pages.

Microsoft Corporation, "Microsoft Windows XP Professional Resource Kit, Second Edition," Jun. 11, 2003, 28 pages.

Nemethova et al., "Flexible Error Concealment for H.264 Based on Directional Interpolation," *IEEE*, (2005), 6 pages.

Park et al., "Content-Based Adaptive Spatio-Temporal Methods for MPEG Repair," *IEEE Transactions on Image Processing*, vol. 13, No. 8, Aug. 2004, 8 pages.

Patel et al., "Performance of a Software MPEG Video Decoder," *ACM Proc.*, (1993), 8 pages.

Shen et al., "Accelerate Video Decoding with Generic GPU," *IEEE Transactions on Circuits and Systems for Video Technology*, vol. 15, No. 5 (May 2005) pp. 685-693.

Su et al., "Improved Error Concealment Algorithms Based on H.264/AVC Non-normative Decoder," *IEEE*, (2004) 4 pages.

Sullivan et al., "The H.264/AVC Advanced Video Coding Standard: Overview and Introduction to the Fidelity Range Extensions," *SPIE conference on Applications of Digital Image Processing XXVII, Special Session on Advances in the New Emerging Standard*, Aug. 2004, 21 pages.

Swann, "Resilient Video Coding for Noisy Channels," *IEEE Colloquium on Data Compression: Methods and Implementations*, (1999), 5 pages.

Thomos et al., "Error-resilient transmission of H.264/AVC streams using flexible macroblock ordering," *IEEE*, (2005) 7 pages.

Wang et al., "A Platform-Based MPEG-4 Advanced Video Coding (AVC) Decoder with Block Level Pipelining," *Proceedings of the 2003 Joint Conference of the Fourth International Conference on Information, Communications and Signal Processing, and the Fourth Pacific Rim Conference on Multimedia*, vol. 1, Issue 15-18, Dec. 2003, pp. 51-55.

Sullivan, "Seven Steps Toward a More Robust Codec Design," JVT-C117 (May 2002) 7 pages.

Wang et al., "Isolated Regions: Motivations, Problems, and Solutions," JVT-C072 (May 2002) 13 pages.

Wang et al., "Real-time Video Communications over Unreliable Networks," IEEE Signal Processing Magazine, vol. 17, No. 4, (Jul. 2000), pp. 61-82.

Bordoloi et al., "Hardware Accelerated Interactive Vector Field Visualization: A level of detail approach," Eurographics 2002, vol. 21 (2002), No. 3, 10 pages.

Digit-Life, "AMD/ATI and NVIDIA Graphics Cards in Video Decoding Tasks," Jun. 25, 2007, http://www.digit-life.com/articles2/video/video.dec.2007-page1.html, 9 pages.

(56) References Cited

OTHER PUBLICATIONS

Geomantics, "GenesisIV Tutorial: Startup issues," http://www.geomantics.com/tutoria122.htm, visited on Sep. 24, 2008, 3 pages.

The Elder Geek on Windows XP, "Camtasia Why Playback is Black" http://www.theeldergeek.com/forum/lofiversion/index.php?t15009.html, Dec. 2005, 5 pages.

Microsoft, "Error Message: CONF Caused a Divide Error in Module Msvfw32.dll," http://support.microsoft.com/kb/263031, Oct. 2006, 2 pages.

Sonic Solutions, "CinePlayer™ DVD Decoder Pack for Windows® XP," http://www.sonic.com/products/Consumer/CinePlayer/Technology/acceleration.aspx, ©2007, visited on Sep. 24, 2008, 10 pages.

* cited by examiner

ADJUSTING HARDWARE ACCELERATION FOR VIDEO PLAYBACK BASED ON ERROR DETECTION

BACKGROUND

Companies and consumers increasingly depend on computers to process, distribute, and play back high quality video content. Engineers use compression (also called source coding or source encoding) to reduce the bit rate of digital video. Compression decreases the cost of storing and transmitting video information by converting the information into a lower bit rate form. Decompression (also called decoding) reconstructs a version of the original information from the compressed form. A "codec" is an encoder/decoder system.

Compression can be lossless, in which the quality of the video does not suffer, but decreases in bit rate are limited by the inherent amount of variability (sometimes called source entropy) of the input video data. Or, compression can be lossy, in which the quality of the video suffers, and the lost quality cannot be completely recovered, but achievable decreases in bit rate are more dramatic. Lossy compression is often used in conjunction with lossless compression—lossy compression establishes an approximation of information, and the lossless compression is applied to represent the approximation.

A basic goal of lossy compression is to provide good rate-distortion performance. So, for a particular bit rate, an encoder attempts to provide the highest quality of video. Or, for a particular level of quality/fidelity to the original video, an encoder attempts to provide the lowest bit rate encoded video. In practice, considerations such as encoding time, encoding complexity, encoding resources, decoding time, decoding complexity, decoding resources, overall delay, and/or smoothness in quality/bit rate changes also affect decisions made in codec design as well as decisions made during actual encoding.

In general, video compression techniques include "intra-picture" compression and "inter-picture" compression. Intra-picture compression techniques compress a picture with reference to information within the picture, and inter-picture compression techniques compress a picture with reference to a preceding and/or following picture (often called a reference or anchor picture) or pictures.

For intra-picture compression, for example, an encoder splits a picture into 8×8 blocks of samples, where a sample is a number that represents the intensity of brightness or the intensity of a color component for a small, elementary region of the picture, and the samples of the picture are organized as arrays or planes. The encoder applies a frequency transform to individual blocks. The frequency transform converts an 8×8 block of samples into an 8×8 block of transform coefficients. The encoder quantizes the transform coefficients, which may result in lossy compression. For lossless compression, the encoder entropy codes the quantized transform coefficients.

Inter-picture compression techniques often use motion estimation and motion compensation to reduce bit rate by exploiting temporal redundancy in a video sequence. Motion estimation is a process for estimating motion between pictures. For example, for an 8×8 block of samples or other unit of the current picture, the encoder attempts to find a match of the same size in a search area in another picture, the reference picture. Within the search area, the encoder compares the current unit to various candidates in order to find a candidate that is a good match. When the encoder finds an exact or "close enough" match, the encoder parameterizes the change in position between the current and candidate units as motion data (such as a motion vector). In general, motion compensation is a process of reconstructing pictures from reference picture(s) using motion data.

The example encoder also computes the sample-by-sample difference between the original current unit and its motion-compensated prediction to determine a residual (also called a prediction residual or error signal). The encoder then applies a frequency transform to the residual, resulting in transform coefficients. The encoder quantizes the transform coefficients and entropy codes the quantized transform coefficients.

If an intra-compressed picture or motion-predicted picture is used as a reference picture for subsequent motion compensation, the encoder reconstructs the picture. A decoder also reconstructs pictures during decoding, and it uses some of the reconstructed pictures as reference pictures in motion compensation. For example, for an 8×8 block of samples of an intra-compressed picture, an example decoder reconstructs a block of quantized transform coefficients. The example decoder and encoder perform inverse quantization and an inverse frequency transform to produce a reconstructed version of the original 8×8 block of samples.

As another example, the example decoder or encoder reconstructs an 8×8 block from a prediction residual for the block. The decoder decodes entropy-coded information representing the prediction residual. The decoder/encoder inverse quantizes and inverse frequency transforms the data, resulting in a reconstructed residual. In a separate motion compensation path, the decoder/encoder computes an 8×8 predicted block using motion vector information for displacement from a reference picture. The decoder/encoder then combines the predicted block with the reconstructed residual to form the reconstructed 8×8 block.

I. Video Codec Standards

Over the last two decades, various video coding and decoding standards have been adopted, including the H.261, H.262 (MPEG-2) and H.263 series of standards and the MPEG-1 and MPEG-4 series of standards. More recently, the H.264 standard (sometimes referred to as AVC or JVT) and VC-1 standard have been adopted. For additional details, see representative versions of the respective standards.

Such a standard typically defines options for the syntax of an encoded video bit stream according to the standard, detailing the parameters that must be in the bit stream for a video sequence, picture, block, etc. when particular features are used in encoding and decoding. The standards also define how a decoder conforming to the standard should interpret the bit stream parameters—the bit stream semantics. In many cases, the standards provide details of the decoding operations the decoder should perform to achieve correct results. Often, however, the low-level implementation details of the operations are not specified, or the decoder is able to vary certain implementation details to improve performance, so long as the correct decoding results are still achieved. Moreover, many standards fail to address in a satisfactory way, or only partially address, how a decoder should react when it detects errors in a bit stream, how the decoder should recover from such errors, and how the decoder should conceal such errors.

During development of a standard, engineers may concurrently generate reference software, sometimes called verification model software or JM software, to demonstrate rate-distortion performance advantages of the various features of the standard. Typical reference software provides a "proof of concept" implementation that is not algorithmically optimized or optimized for a particular hardware platform. Moreover, typical reference software does not address multithreading implementation decisions, instead assuming a single threaded implementation for the sake of simplicity. Often, reference software fails to address in a satisfactory way, or only partially addresses, issues of error detection, recovery and concealment, especially when such issues surface during multithreaded decoding.

II. Acceleration of Video Decoding

While some video decoding and encoding operations are relatively simple, others are computationally complex. For example, inverse frequency transforms, fractional sample interpolation operations for motion compensation, in-loop deblock filtering, post-processing filtering, color conversion, and video re-sizing can require extensive computation. This computational complexity can be problematic in various scenarios, such as decoding of high-quality, high-bit rate video (e.g., compressed high-definition video). In particular, decoding tasks according to more recent standards such as H.264 and VC-1 can be computationally intensive and consume significant memory resources.

Some decoders use video acceleration to offload selected computationally intensive operations to a graphics processor or other specialized hardware. For example, in some configurations, a computer system includes a primary central processing unit ("CPU") as well as a graphics processing unit ("GPU") or other hardware specially adapted for graphics processing. A decoder uses the primary CPU as a host to control overall decoding and uses the GPU to perform simple operations that collectively require extensive computation, accomplishing video acceleration.

In a typical software architecture for video acceleration during video decoding, a video decoder controls overall decoding and performs some decoding operations using a host CPU. The decoder signals control information (e.g., picture parameters, macroblock parameters) and other information to a device driver for a hardware video accelerator (e.g., with GPU) across an acceleration interface.

The acceleration interface is exposed to the decoder as an application programming interface ("API"). The device driver associated with the video accelerator is exposed through a device driver interface ("DDI"). In an example interaction, the decoder fills a buffer with instructions and information then calls a method of an interface to alert the device driver through the operating system. The buffered instructions and information, opaque to the operating system, are passed to the device driver by reference, and video information is transferred to GPU memory if appropriate. While a particular implementation of the API and DDI may be tailored to a particular operating system or platform, in some cases, the API and/or DDI can be implemented for multiple different operating systems or platforms.

In some cases, the data structures and protocol used to parameterize acceleration information are conceptually separate from the mechanisms used to convey the information. In order to impose consistency in the format, organization and timing of the information passed between the decoder and device driver, an interface specification can define a protocol for instructions and information for decoding according to a particular video decoding standard or product. The decoder follows specified conventions when putting instructions and information in a buffer. The device driver retrieves the buffered instructions and information according to the specified conventions and performs decoding appropriate to the standard or product. An interface specification for a specific standard or product is adapted to the particular bit stream syntax and semantics of the standard/product.

Given the critical importance of video compression and decompression to digital video, it is not surprising that compression and decompression are richly developed fields. Whatever the benefits of previous techniques and tools, however, they do not have the advantages of the following techniques and tools.

SUMMARY

In summary, techniques and tools are described for various aspects of error concealment in video decoder implementations. These techniques and tools help, for example, to efficiently conceal errors detected during video decoding. For example, a video decoder which utilizes adjustment of hardware acceleration level is described. In an implementation, the decoder detects errors in a bitstream as it decodes the bitstream using different levels of error detection based on decoding characteristics. The decoder implementation then analyzes the error values statistically statistical analysis is performed on the error values as they are detected. In one technique performed by this example implementation, if the bitstream is categorized as fitting a high error rate state in a bitstream model, then hardware acceleration is dropped. In another technique, error statistics based on run-lengths of good and bad bitstream units are kept, and compared to predetermined thresholds. If the thresholds are exceeded, the hardware acceleration level is dropped. The decoder drops the level in order to take advantage of superior error handing abilities of software-based decoding over hardware-accelerated decoding.

In one implementation, a computer comprising video decoding hardware performs a method for determining when, during playback, to adjust which video decoding steps are performed by the video decoding hardware based on bitstream quality. The method comprises receiving a video bitstream at the computer, the computer configured at the time of decoding to perform variable length decoding and inverse discrete cosine transform decoding using the video decoding hardware. The method comprises then performing a lightweight error detection on pictures in the bitstream as they are received in the bitstream to determine if the pictures have errors, computing mean and variance values for lengths of runs of non-corrupt pictures, computing mean and variance values for lengths of runs of corrupt pictures, and computing the probability of good pictures based on pictures received. The method also comprises comparing the computed mean and variance values to predetermined thresholds, determining, based on the comparing the mean and variance values to pre-determined thresholds, that variable length decoding should be performed in software, and responsive to the determining that variable length decoding should be performed in software, adjusting decoding such that variable length decoding is performed on the computer in software, and inverse discrete cosine transform decoding is performed in hardware.

In another implementation, a method is described for directing video decoding on a computer comprising acceleration hardware for video decoding. The method comprises, during decoding of a video bitstream, reviewing the video bitstream for errors, performing a statistical analysis of errors reviewed in the bitstream to determine error statistics for the bitstream, determining, based on the error statistics, that a level at which hardware acceleration is performed should be adjusted, and responsive to determining that a level at which hardware acceleration is performed should be adjusted, adjusting the level at which hardware acceleration is performed.

In another implementation, one or more computer-readable storage media are described which contain computer-executable instructions which, when executed by a computer comprising hardware-based video acceleration, cause the computer to perform a method for controlling the hardware-based video acceleration. The method comprises determining errors in a video bitstream, categorizing the bitstream as fitting a state of an error model, the categorizing being based on a statistical analysis of the errors in the bitstream, and controlling the hardware-based video acceleration to perform different tasks based on the error model to which the bitstream is categorized.

The various techniques and tools can be used in combination or independently. Additional features and advantages will be made more apparent from the following detailed description of different embodiments, which proceeds with reference to the accompanying figures.

DETAILED DESCRIPTION

Figure 1:
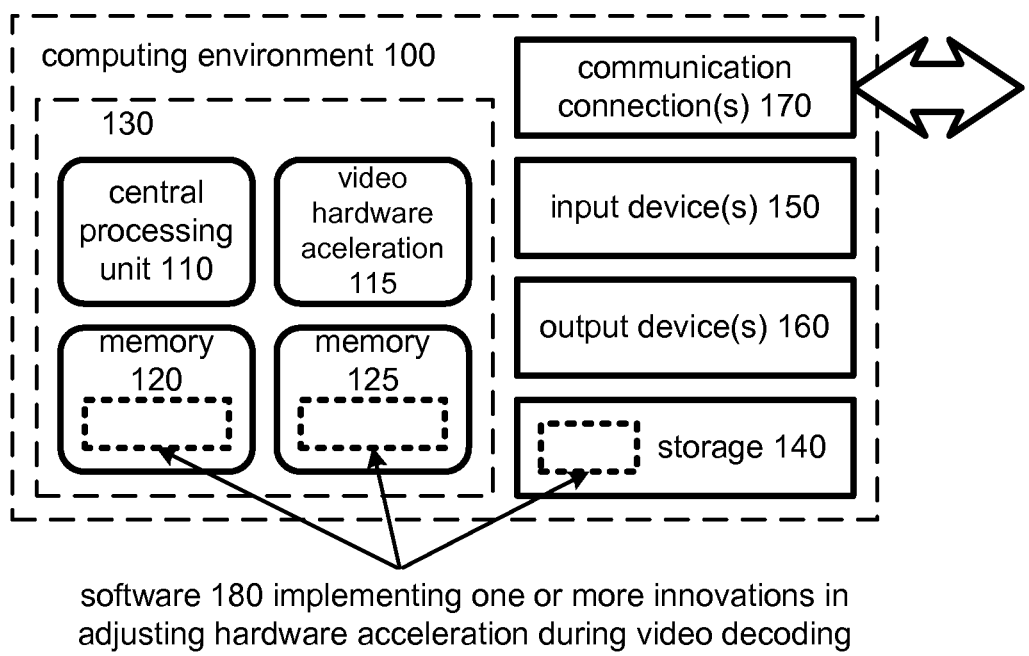
FIG. 1 is a block diagram illustrating a generalized example of a suitable computing environment in which several of the described embodiments may be implemented.

Acceleration of video decoding often improves computational performance by offloading selected computationally intensive operations. Existing approaches fail to address in a satisfactory way, however, or only partially address, how to handle issues of error recovery and concealment that surface during decoding using video acceleration. Sometimes dedicated hardware does not respond robustly to bitstream errors, while, for example, a decoder running on a CPU may, by virtue of running on the CPU, allow for more robust error correction. In these cases, if system software sends corrupt compressed data to hardware, it may cause hardware to crash or hang. One example can be found on typical PC-based video decoders, such as for MPEG2 or H.264 decoders, which use graphics card hardware to decode compressed video and display it on screen. If input MPEG2 or H.264 bitstreams are corrupt because of transmission errors, capture issues, etc., graphics hardware might not be able to handle these bitstreams properly. This divide between error handling capabilities may be greater or smaller depending on the particular decoding processes that the decoder requests the hardware acceleration solution to perform.

The present application relates to innovations in implementations of error handling and/or error concealment in video decoders which utilize hardware acceleration. Many of these innovations improve decoding performance by allocating resources between CPU-run software decoder solutions and hardware acceleration, such as on a GPU. These innovations include:

1. Adaptively changing the level of hardware acceleration based on error rate found in a bitstream.

2. Using a lower level of hardware acceleration when error rates are higher in order to take advantage of superior error concealment capabilities of software decoding techniques.

3. Parsing bitstreams, monitoring bitstream error parameters and statistics, and using these values to reduce or increase hardware acceleration.

4. Creating models for video bitstream and categorizing bitstreams based on error rates.

5. Using models and categorization of bitstream to decide when to switch hardware acceleration.

6. Switching back and forth between hardware-accelerated decoding and software-only decoding when suggested by bitstream characteristics.

For example, in order to conceal errors during video decoding, the hardware-accelerated decoding processes of a standard such as, MPEG-2, MPEG-4, H.264 or VC-1 and implementations thereof are modified to allow for directed hardware acceleration based on bitstream error rate. Specific examples of identified ways of improving error handling are described below.

Collectively, these improvements, as well as decoding techniques which the improvements operate over, are at times loosely referred to as "optimizations." As used conventionally and as used herein, the term "optimization" means an improvement that is deemed to provide a good balance of performance in a particular scenario or platform, considering computational complexity, memory use, processing speed, and/or other factors. Use of the term "optimization" does not foreclose the possibility of further improvements, nor does it foreclose the possibility of adaptations for other scenarios or platforms.

With these innovations, efficient decoder implementations have been provided for diverse platforms. The implementations include media players for gaming consoles with complex, special-purpose hardware and graphics capabilities, personal computers, and set-top boxes/digital video receivers.

Various alternatives to the implementations described herein are possible. For example, certain techniques described with reference to flowchart diagrams can be altered by changing the ordering of stages shown in the flowcharts, by repeating or omitting certain stages, etc., while achieving the same result. As another example, while several of the innovations described below are presented in terms of MPEG-2 decoding examples, the innovations are also applicable to other types of decoders (e.g., MPEG-4, H.264, VC-1) that provide or support the same or similar decoding features.

The various techniques and tools described herein can be used in combination or independently. For example, although flowcharts in the figures typically illustrate techniques in isolation from other aspects of decoding, the illustrated techniques in the figures can typically be used in combination with other decoding techniques (e.g., shown in other figures). Different embodiments implement one or more of the described techniques and tools. Some of the techniques and tools described herein address one or more of the problems noted in the Background. Typically, a given technique/tool does not solve all such problems, however. Rather, in view of constraints and tradeoffs in decoding time and/or resources, the given technique/tool improves performance for a particular implementation or scenario.

I. Computing Environment

FIG. 1 illustrates a generalized example of a suitable computing environment (100) in which several of the described embodiments may be implemented. The computing environment (100) is not intended to suggest any limitation as to scope of use or functionality, as the techniques and tools may be implemented in diverse general-purpose or special-purpose computing environments such as personal computers, consumer electronic devices, and the like.

With reference to FIG. 1, the computing environment (100) includes at least one CPU (110) and associated memory (120) as well as at least one video hardware acceleration unit (115) and associated memory (125) used for video acceleration. In FIG. 1, this most basic configuration (130) is included within a dashed line. The processing unit (110) executes computer-executable instructions and may be a real or a virtual processor. In a multi-processing system, multiple processing units execute computer-executable instructions to increase processing power. A host encoder or decoder process offloads certain operations to the hardware acceleration unit (115). In some implementations, these operations may be computationally intensive operations (e.g., fractional sample interpolation for motion compensation, in-loop deblock filtering). In others, entire sub-processes of the general decoding process may be performed by the video hardware acceleration (e.g., variable-length decoding, inverse transform decoding, motion compensation). The memory (120, 125) may be volatile memory (e.g., registers, cache, RAM), non-volatile memory (e.g., ROM, EEPROM, flash memory, etc.), or some combination of the two. The memory (120, 125) stores software (180) for a decoder implementing one or more of the decoder innovations described herein for error detection, concealment or recovery.

A computing environment may have additional features. For example, the computing environment (100) includes storage (140), one or more input devices (150), one or more output devices (160), and one or more communication connections (170). An interconnection mechanism (not shown) such as a bus, controller, or network interconnects the components of the computing environment (100). Typically, operating system software (not shown) provides an operating environment for other software executing in the computing environment (100), and coordinates activities of the components of the computing environment (100).

The storage (140) may be removable or non-removable, and includes magnetic disks, magnetic tapes or cassettes, CD-ROMs, DVDs, or any other medium which can be used to store information and which can be accessed within the computing environment (100). The storage (140) stores instructions for the software (180).

The input device(s) (150) may be a touch input device such as a keyboard, mouse, pen, or trackball, a voice input device, a scanning device, or another device that provides input to the computing environment (100). For audio or video encoding, the input device(s) (150) may be a sound card, video card, TV tuner card, or similar device that accepts audio or video input in analog or digital form, or a CD-ROM or CD-RW that reads audio or video samples into the computing environment (100). The output device(s) (160) may be a display (e.g., monitor, display screen, or the like), printer, speaker, CD-writer, or another device that provides output from the computing environment (100).

The communication connection(s) (170) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The techniques and tools can be described in the general context of computer-readable media. Computer-readable media are any available media that can be accessed within a computing environment. By way of example, and not limitation, with the computing environment (100), computer-readable media include memory (120), computer-readable storage media (140) (e.g., CDs, DVDs, diskettes, flash drives, removable hard drives, hard drive arrays), and combinations of any of the above.

The techniques and tools can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "determine," "compute" and "categorize" to describe computer operations in a computing environment. These terms are high-level abstractions for operations performed by a computer, and should not be confused with acts performed by a human being. The actual computer operations corresponding to these terms vary depending on implementation.

II. Generalized Video Decoder

Figure 2:
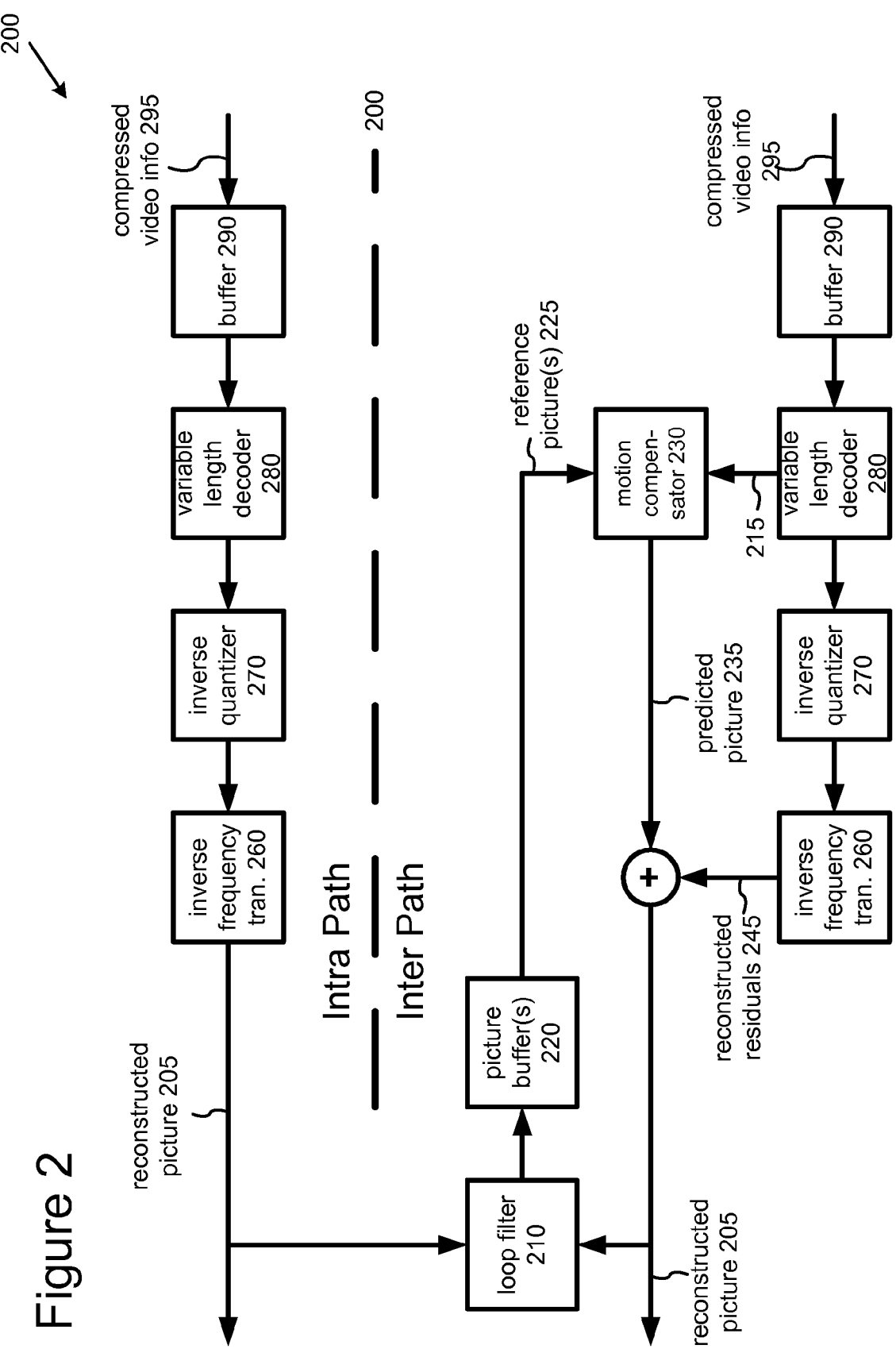
FIG. 2 is a block diagram of a generalized video decoder in conjunction with which several of the described embodiments may be implemented.

FIG. 2 is a block diagram of a generalized video decoder (200) in conjunction with which several described embodiments may be implemented. The relationships shown between modules within the decoder (200) indicate general flows of information in the decoder; other relationships are not shown for the sake of simplicity. In particular, while a decoder host performs some operations of modules of the decoder (200), in particular implementations, a hardware-based video accelerator (or video accelerator) performs other operations (such as inverse frequency transforms, fractional sample interpolation, motion compensation, in-loop deblocking filtering, color conversion, post-processing filtering and/or picture re-sizing). For example, the decoder (200) passes instructions and information to the video accelerator as described in "Microsoft DirectX VA: Video Acceleration API/DDI," version 1.01, a later version of "DXVA" or another acceleration interface. Different versions of a given video accelerator may perform different levels of decoding, as well. For example, "MoComp" or "IDCT" DXVA handles particular decoding tasks, such as motion compensation or inverse frequency transform, in the video accelerator, while "VLD" DXVA handles even entropy decoding in the video accelerator.

In general, once the hardware-based video accelerator reconstructs video information, it maintains some representation of the video information rather than passing information back. For example, after a video accelerator reconstructs an output picture, the accelerator stores it in a picture store, such as one in memory associated with a GPU, for use as a reference picture. The accelerator then performs in-loop deblock filtering and fractional sample interpolation on the picture in the picture store.

In some implementations, different video acceleration profiles result in different operations being offloaded to a video accelerator. For example, one profile may only offload out-of-loop, post-decoding operations, while another profile offloads in-loop filtering, fractional sample interpolation and motion compensation as well as the post-decoding operations. Still another profile can further offload frequency transform operations. In still other cases, different profiles each include operations not in any other profile.

Returning to FIG. 2, the decoder (200) processes video pictures, which may be video frames, video fields or combinations of frames and fields. The bit stream syntax and semantics at the picture and macroblock levels may depend on whether frames or fields are used. The decoder (200) is block-based and uses a 4:2:0 macroblock format for frames. For fields, the same or a different macroblock organization and format may be used. 8×8 blocks may be further sub-divided at different stages. Alternatively, the decoder (200) uses a different macroblock or block format, or performs operations on sets of samples of different size or configuration.

The decoder (200) receives information (295) for a compressed sequence of video pictures and produces output including a reconstructed picture (205) (e.g., progressive video frame, interlaced video frame, or field of an interlaced video frame). The decoder system (200) decompresses predicted pictures and key pictures. For the sake of presentation, FIG. 2 shows a path for key pictures through the decoder system (200) and a path for predicted pictures. Many of the components of the decoder system (200) are used for decompressing both key pictures and predicted pictures. The exact operations performed by those components can vary depending on the type of information being decompressed.

A buffer (290) receives the information (295) for the compressed video sequence and makes the received information available to the entropy decoder (280). The variable-length decoder ("VLD") (280) decodes entropy-coded quantized data as well as encoded side information, typically applying the inverse of encoding performed in the encoder. A motion compensator (230) applies motion information (215) to one or more reference pictures (225) to form motion-compensated predictions (235) of sub-blocks, blocks and/or macroblocks of the picture (205) being reconstructed in a motion compensation ("MC") process. One or more picture stores store previously reconstructed pictures for use as reference pictures.

The decoder (200) also reconstructs prediction residuals. An inverse quantizer (270) inverse quantizes entropy-decoded data. An inverse frequency transformer (260) converts the quantized, frequency domain data into spatial domain video information. For example, the inverse frequency transformer (260) applies an inverse block transform to sub-blocks and/or blocks of the frequency transform coefficients, producing sample data or prediction residual data for key pictures or predicted pictures, respectively. In one example, the inverse frequency transformer will apply an inverse discrete cosine transform ("IDCT") to discrete cosine transform coefficients. Certain descriptions of the inverse quantization and inverse frequency transform may be referred collectively as "IDCT" herein, but should not be read to require or omit either process or to require particular inverse frequency transformations. The inverse frequency transformer (260) may apply an 8×8, 8×4, 4×8, 4×4, or other size inverse frequency transform.

For a predicted picture, the decoder (200) combines reconstructed prediction residuals (245) with motion compensated predictions (235) to form the reconstructed picture (205). A motion compensation loop in the video decoder (200) includes an adaptive deblocking filter (210). The decoder (200) applies in-loop filtering (210) to the reconstructed picture to adaptively smooth discontinuities across block/sub-block boundary rows and/or columns in the picture. The decoder stores the reconstructed picture in a picture buffer (220) for use as a possible reference picture.

Generally, the functions of error detection, error concealment and error recovery are distributed among the modules of the decoder (200) shown in FIG. 2. For example, the buffer (290) or other module can scan encoded data in decoder buffers for bit-flip errors, checksum errors or missing sub-units of the bitstream, such as network abstraction layer units (NALUs) or other such units. Both terms are described below. The entropy decoder (280) can detect errors (e.g., caused by bit-flips) during entropy decoding. The motion compensator (230) or other module can adjust pictures buffered in the picture buffer(s) (220) as part of error concealment. A controller (not shown) or other module in a decoder host can coordinate operations the demultiplexer (290), entropy decoder (280), motion compensator (230) and other modules as part of error detection, error recovery and error concealment.

Depending on implementation and the type of decompression desired, modules of the decoder can be added, omitted, split into multiple modules, combined with other modules, and/or replaced with like modules. In alternative embodiments, decoders with different modules and/or other configurations of modules perform one or more of the described techniques. Specific embodiments of video decoders typically use a variation or supplemented version of the generalized decoder (200).

For the sake of presentation, the following table provides example explanations for acronyms and selected shorthand terms used herein.

| Term | Explanation |
|---|---|
| block | arrangement (in general, having any size) of sample values for pixel data or residual data, for example, including the possible blocks in H.264/AVC - 4 × 4, 4 × 8, 8 × 4, 8 × 8, 8 × 16, 16 × 8, and 16 × 16 |
| ED | entropy decoding |
| INTRA | spatial intra-prediction |
| LF | loop filtering |
| MB | megabyte OR macroblock, depending on context; a macroblock is, e.g., 16 × 16 arrangement of sample values for luma with associated arrangements of sample values for chroma |
| MC | motion compensation |
| NALU | network abstraction layer unit |

-continued

| Term | Explanation |
|---|---|
| PROG | progressive |
| stage (of decoding) | a set of different passes/steps to decode a picture, such as PED, VLD, IDCT, MC and so on |
| sub-block | a partition of a sub-MB, e.g., 8 × 4, 4 × 8 or 4 × 4 block or other size block |
| sub-MB | a partition of an MB, e.g., 16 × 8, 8 × 16 or 8 × 8 block or other size block; in some contexts, the term sub-MB also indicates sub-blocks |
| VLD | variable-length decoding |

III. Hardware Acceleration for Example MPEG-2 Bitstreams

As discussed above, many modern computers and multimedia playback devices use some hardware acceleration to offload video decoding tasks to specialized decoding hardware. On Windows-based computer video, decoders talk to graphics hardware using DirectX Video Acceleration APIs to offload compressed video decoding operations onto graphics hardware. Video decoding operations take place when someone is watching DVD, TV, streaming video etc.

Figure 3:
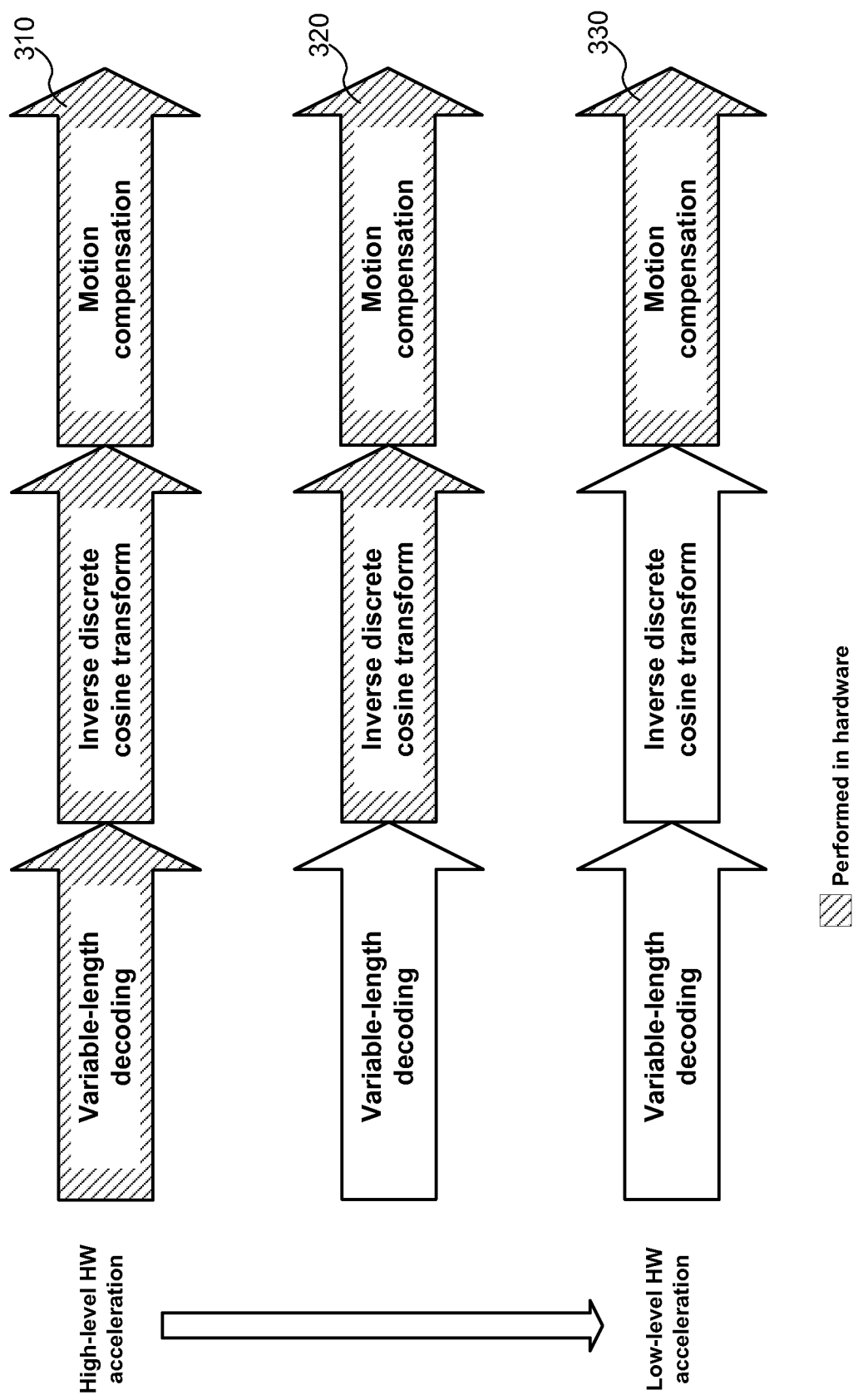
FIG. 3 is a diagram illustrating examples of levels of hardware acceleration for video decoding.

FIG. 3 shows examples of how graphics hardware can support multiple levels of hardware acceleration. The levels illustrated in FIG. 3 follow an MPEG-2 compressed bitstream utilizing multiple decoding stages. Some stages or subprocesses are not disclosed in FIG. 3 for the sake of clarity. As discussed above, first, a decoder has to parse/decode an input bitstream using a Variable Length Decoding ("VLD") method. This stage typically results in motion vectors and Discrete Cosine Transform coefficients. Next, a decoder performs an Inverse Discrete Cosine Transform ("IDCT") operation on the coefficients. Motion Compensation ("MC") is then applied using motion vectors and previous decoded frames. These processes result in a frame being decoded and decoder outputs RGB value for each pixel on display device. As illustrated in FIG. 3, each stage can be thought of as leading into the next, though different implementations may perform certain processes in parallel for different blocks, sub-blocks, or even frames or pictures.

FIG. 3 also illustrates that video decoding hardware can support different levels of acceleration. For example, a hardware decoding engine which performs full decoding will support all 3 VLD, IDCT, and MC stages. Such a case is illustrated as example 310. In this case host decoding software does not perform any decoding itself. Instead, it simply parses the bitstreams and sends compressed data to hardware. The acceleration hardware performs all decoding operations and sends uncompressed data back to host software for display. This is also known as the hardware acceleration acting at a "high level."

In the second example 320, the decoding hardware might support IDCT and MC stages but not VLD. Or, it may support VLD but be set by the decoding software to not perform the processes of that stage. In this case, the host software decoder would perform VLD and then send motion vectors and DCT coefficients to the acceleration hardware for performing the rest of the decoding stages.

In the final illustrated example 330, hardware might support only the MC stage, or may be set to only perform the MC stage. In this case, the software decoder performs VLD and IDCT on the CPU and sends motion vectors to the hardware for performing MC. This is also referred to as the hardware acceleration acting at a "low level." In another example, not illustrated, the software decoder may opt to use no hardware acceleration at all, resulting in the lowest level of hardware acceleration.

Because many hardware video accelerators possess the ability to operate at different levels, the techniques described herein take advantage of this capability to allow for switching and/or adjustment of video acceleration level based on bitstream quality. In particular, when decoding software is using high-level hardware decoding, the software typically has much less control with which it can handle bad bitstreams and not crash or display unacceptably poor video. Thus, it is desirable to identify points at which it would be desirable to switch to a lower level of hardware acceleration. The instant techniques identify these opportunities by analyzing errors received in a video bitstream and determining when the bitstream is too corrupt for the current level of hardware acceleration. This allows for the software decoder to perform more robust error correction, thus providing higher quality video and preventing crashes or other errors. In other circumstances, similar techniques can be used to identify when the bitstream is of a high enough quality that an increase in hardware acceleration quality is acceptable. This allows for better usage of hardware acceleration capabilities at times when they are best used.

Figure 4:
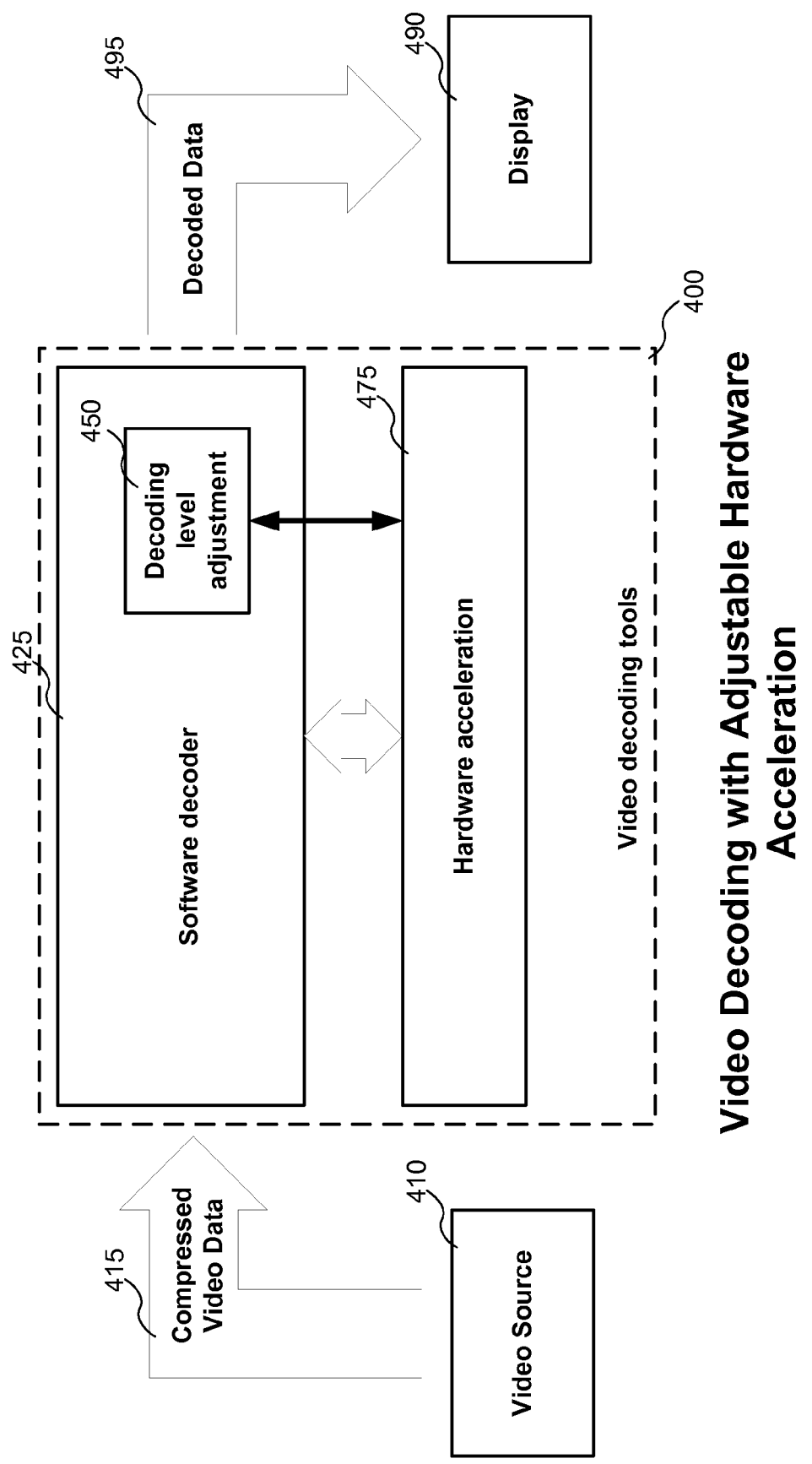
FIG. 4 is a block diagram of a video decoder utilizing hardware acceleration adjustment techniques described herein.

FIG. 4 illustrates one implementation of a system for taking advantage of this flexibility in interactions between a software decoder and hardware acceleration. FIG. 4 illustrates a video decoding system 400 which decodes compressed video data 415, received from a video source 410. As mentioned above, in various implementations, the compressed video data may comprise data encoded in MPEG-2, MPEG-4, H.264/AVC, or VC-1 formats, as well as other video formats. Additionally, the inclusion of the video source should not be read to imply any particular source but includes sources of compressed video such as the Internet, intranets, local storage, and removable media. The video decoding system 400, after processing the compressed video data 415, produces decoded data 495 for output, such as to a display 490. In one implementation, the display 490 comprises a monitor on which the decoded video is visually displayed, such as an LCD, CRT, OLCD monitor. In other implementations, the decoded data may take various forms, depending on the requirements of display being output to, or may be output in an encoded form itself, such as a binary form for storage on storage media.

The illustrated video decoding system comprise a software decoder 425 which produces decoded video data 495, along with hardware acceleration 475 which can aid in the process. Each of the illustrated system components communicates with the other, such as through an API, including passing video data, instructions, and status information between the two. While the software decoder 425 and the hardware acceleration 475 are illustrated as single monolithic entities, this should not imply any particular limitation on the makeup or operation of these specific modules. In one implementation, the software decoding is performed by executing video decoding software on the CPU of a general purpose computer; in other implementations, it may be executed on specialized hardware or a special-purpose computer.

Similarly, while the hardware acceleration 475 typically comprises a GPU or other hardware which is specialized for the purpose of decoding video data, various implementations may utilize different hardware and/or software running on the hardware for this purpose. This includes, but is not limited to video cards, on-board video hardware, integrated graphics chipsets, mobile devices, etc. The hardware acceleration may, in various implementations, also provide software. In one implementation, the hardware decoder comprises device driver software through which the software decoder and the hardware acceleration communicate. Various driver implementations may allow for direct, on-the-fly adjustment of hardware acceleration level, or may provide such capabilities through the stopping of the device driver, followed by a starting of a new instance of the driver to control the hardware portion of the hardware acceleration 475 under different settings. Additionally, while the software decoder is illustrated separately from the hardware acceleration, they may be more or less integrated, depending on implementation.

The illustrated software decoder 425 also comprises decoding level adjustment 450, which operates to instruct the hardware acceleration 450 as to how and at what level they are to perform various video decoding stages. In some implementations, the hardware acceleration 475 will also communicate with the decoding level adjustment module, such as to indicate which decoding stages the hardware acceleration is able to perform. For example, some hardware accelerator implementations may only provide acceleration for IDCT and MC stages, while not providing VLD support. This allows the decoding level adjustment module to determine if the level of hardware acceleration can be switched in addition to its determination of whether it should be switched. It should also be noted that, while the decoding level adjustment 450 is illustrated as a part of the software decoder 425, in alternative implementations, the level adjustment techniques may be performed outside of the software decoder and may themselves instruct the software decoding processes on what level to operate at.

Figure 5:
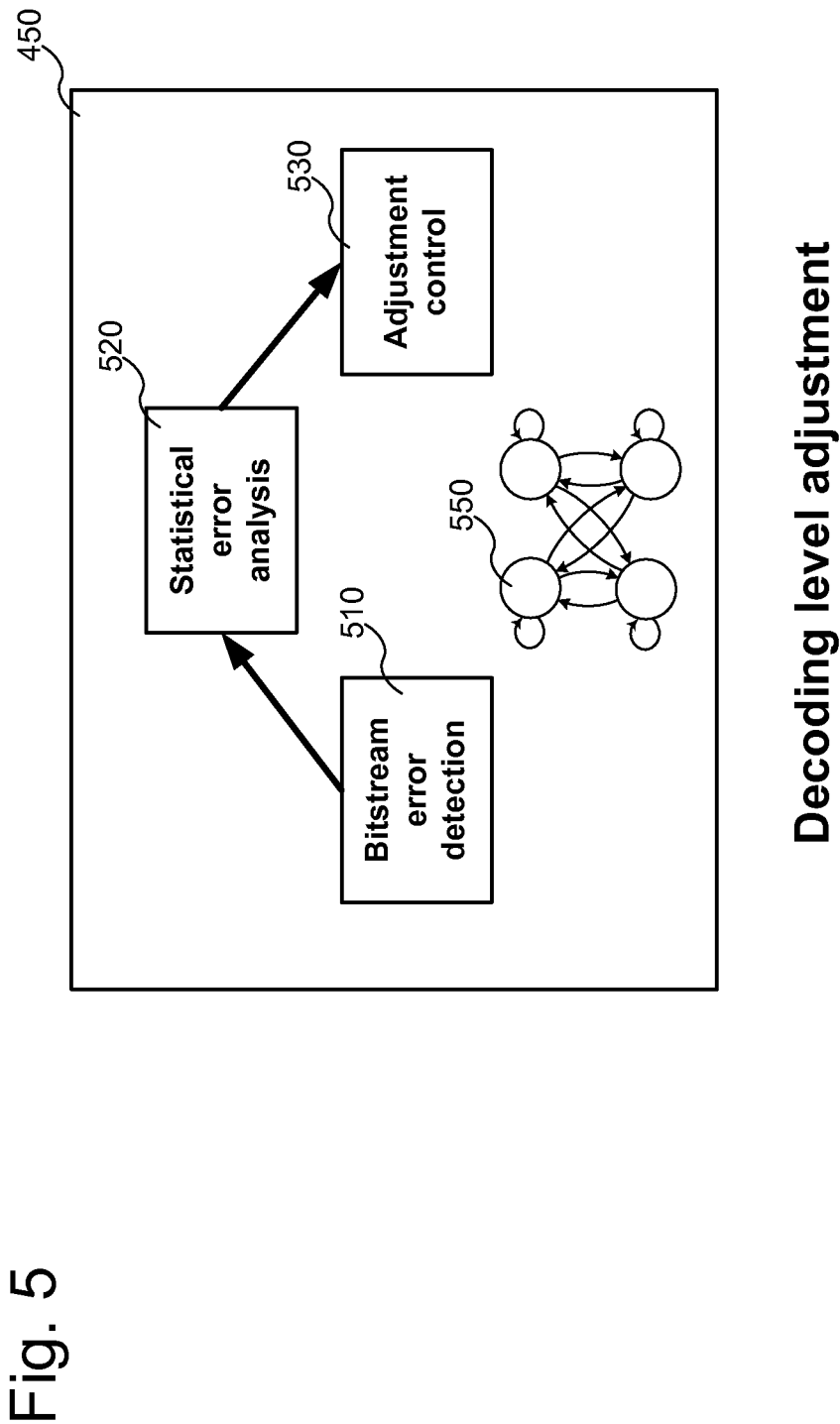
FIG. 5 is a block diagram of a decoding acceleration adjustment module using techniques described herein.

FIG. 5 is a block diagram illustrating one implementation of the decoding level adjustment 450 as part of the software decoder 425. While the diagram of FIG. 5 shows particular software modules and data structures, in various implementations the processes and subprocesses of these modules may be combined, or, in some cases omitted. FIG. 5 illustrates software modules, including modules for bitstream error detection 510, statistical error analysis 520, and adjustment control 530. The bitstream error detection module 510 serves to review incoming video bitstreams as they are received and input into the module. The module then outputs data of when errors are found in the bitstream. In one implementation the module also outputs additional statistics about the bitstream, including data about non-corrupt bitstream portions. The statistical error analysis module 520 perform an analysis on the error data output by the bitstream error detection module 510, and itself outputs metrics by which the software decoder can determine whether the level of the hardware acceleration should be modified. Specific examples of these metrics are described below. Also described below are different implementations of how this error analysis may be performed. In one, for instance, the incoming bitstream is categorized according to a predetermined bitstream model, such as the model 550 known to the decoding level adjustment 450. In another implementation, the statistical error analysis generates error statistics which are compared to predetermined threshold values.

Finally, the metrics generated through the statistical error analysis are used as input by the adjustment control module 530 to adjust the level of the hardware acceleration. As described below, this adjustment may be made in part with reference to information made available by the hardware acceleration 475. In various situations, the adjustment may be made to either increase or decrease the level of the hardware acceleration. In various implementations, the adjustment may be made thought output of signals to acceleration hardware, or by sending instructions to close a software device driver for acceleration hardware followed by instructions to open a new acceleration device at a different level.

IV. Hardware Acceleration Level Adjustment Techniques

A. Bitstream Error Detection and Analysis

Figure 6:
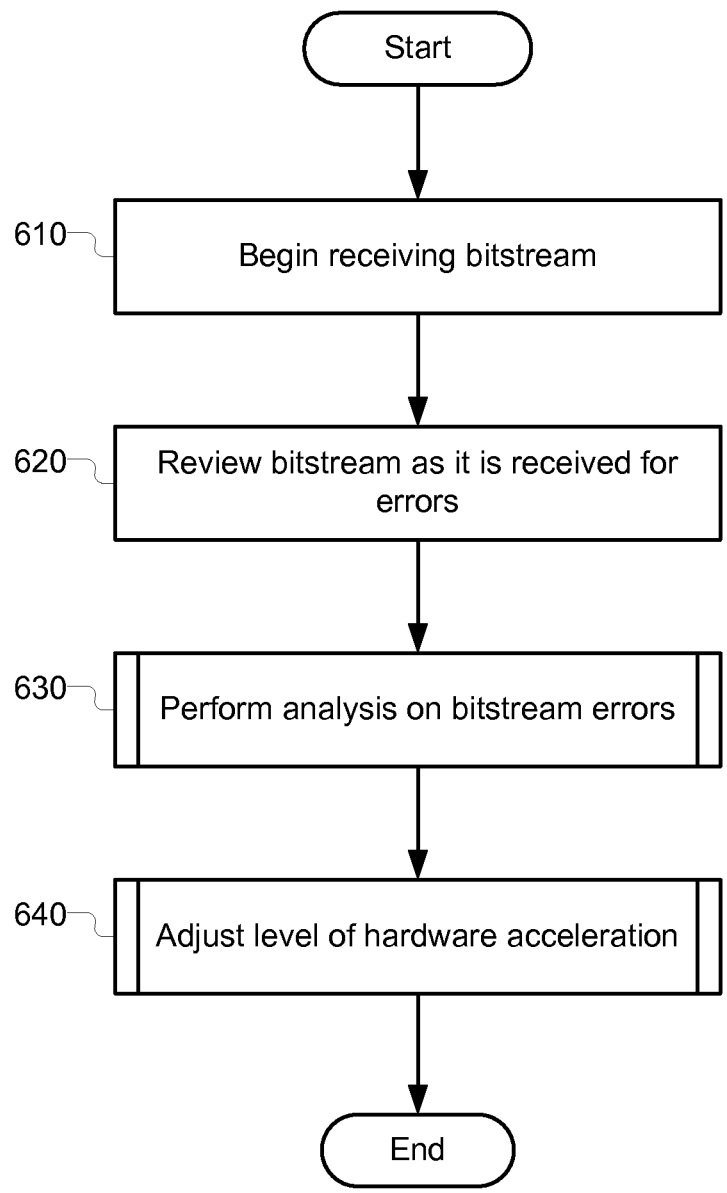
FIG. 6 is a flowchart illustrating an example of a generalized technique for adjusting hardware-based video acceleration based on errors discovered in a video bistream.

FIG. 6 is a flowchart of an example process 600 performed by the software decoder 425 for adjusting hardware acceleration based on bitstream errors. In various implementations, subprocesses of the process 600 may be combined or split into additional processes, and may be performed by separate, dedicated software modules or performed by the same modules.

The process begins at block 610, where the software decoder 425 begins receiving a bitstream for decoding. Next, at block 620 the decoder, for example in the bitstream error detection module 510, reviews the bitstream as it is received to determine if there are errors.

Depending on implementation details and the current decoding status, error detection may be performed in different ways. If the software decoder is already performing the majority of the decoding process, for example if it is performing all decoding or is only using hardware acceleration for motion compensation, then the software decoder 425 may be able to decode the bitstream down to the level of particular image coefficients. In another implementation, the video may be looked at on a unit-by-unit basis, such as per-block or per-macroblock, to determine potential errors. In other implementations, including those described below, bitstream may be inspected at a higher unit-by-unit level, such a on a per-frame, -field, -picture, or -NALU basis.

A deep investigation of the bitstream may be desirable when the bitstream is predominately decoded in software, since the software is already tasked with the work of computing values for display. However, in situations, where the software is performing relatively little of the decoding work, it may be desirable to avoid such intensive error-checking. Indeed, when hardware acceleration is being used at a high level, to have the software decoder performing extensive decoding work on a CPU has the potential to eat up any efficiencies gained by using the hardware acceleration.

Thus, in some implementations, when the hardware acceleration is operating at a high level, the software decoder performs lightweight error detection on the bitstream. For example, the software decoder, in addition to sending the bitstream to the video acceleration hardware, performs an initial decoding of the bitstream, such as the VLD stage, and attempts to determine errors from incompletely-decoded values. In such an implementation, the error detection can still, for example, inspect headers, look for out-of-bounds transform coefficients or indices, check for corrupted syntax, and check for lost, partial, or incomplete packets. Such a process can detect some errors without consuming excess CPU power. While this may provide some decoding redundancy (such as in the case that the hardware acceleration is performing VLD), it provides an intermediate solution that avoids burning up computing resources while still looking for some errors.

In other implementations, even performing the VLD stage in software is too expensive in terms of CPU cycles. For example, in H.264, the VLD stage is very complex and requires many CPU cycles. In this case, error detection can be performed, if the hardware acceleration supports it, by monitoring hardware status flags during hardware-implemented decode operations. For example, in DXVA specification decoding, acceleration hardware provides notifications of the status of frames being decoded. As mentioned above, these lightweight error detection techniques can be performed on a unit-by-unit basis, such as by frames, fields, pictures, or NALUs. Additionally, the data resulting from the error detection can vary in different implementations. In one implementation, the error detection simply signals whether an error exists for each unit of the bitstream which is measured (such as on a picture-by-picture basis). In another, more detailed statistics are kept, such as type of error, or level at which each error is found.

Next, at block 630, in the statistical error analysis module 520, the software decoder 425 performs an analysis on the errors detected. Particular analysis implementations are discussed in greater detail below. Finally, at block 640, in adjustment control module 530, the software decoder 425 adjusts the level of hardware acceleration being used based on metrics produced during the statistical error analysis of block 630. As a result, after adjustment the bitstream will be decoded differently. For example, if the adjustment causes less hardware acceleration, and displaying decoded video with better error correction, as additional decoding stages will be performed in software, which typically provides more robust error handling. Particular implementation examples of this adjustment are also discussed below.

Figure 7:
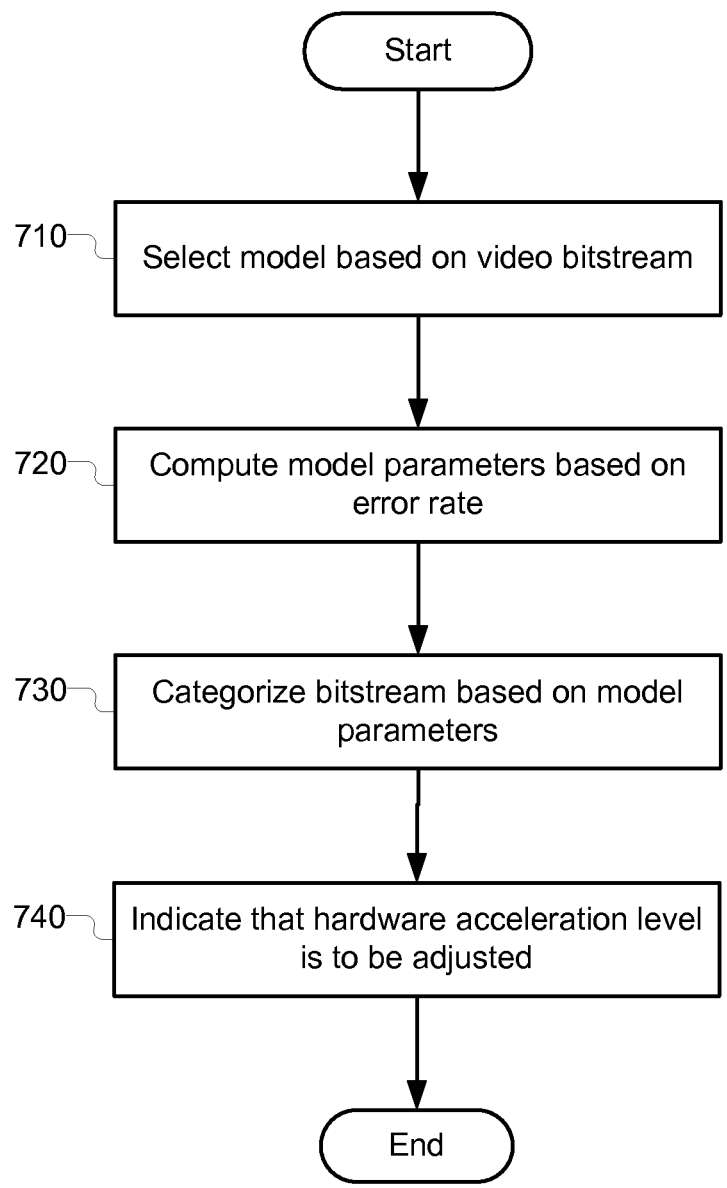
FIG. 7 is a flowchart illustrating an example technique for utilizing a model of a video bitstream to determine when hardware acceleration should be adjusted during decoding of the bitstream.

FIG. 7 is a flowchart of an example process 700 performed by the software decoder 425 for performing statistical error analysis on errors detected using a bitstream model. In various implementations, subprocesses of the process 700 may be combined or split into additional processes, and may be performed by separate, dedicated software modules or performed by the same modules.

The process begins at block 710, where a model is selected based on the incoming video bitstream. In various implementations, the model may be selected according to various aspects of the current decoding job, such as, but not limited to: the type of bitstream being decoded, the video source, bandwidth, and the hardware and software being used for decoding. The model may be predetermined, before the beginning of decoding, or may be selected from a set of predetermined models based on one or more of the aforementioned decoding characteristics.

Figure 8:
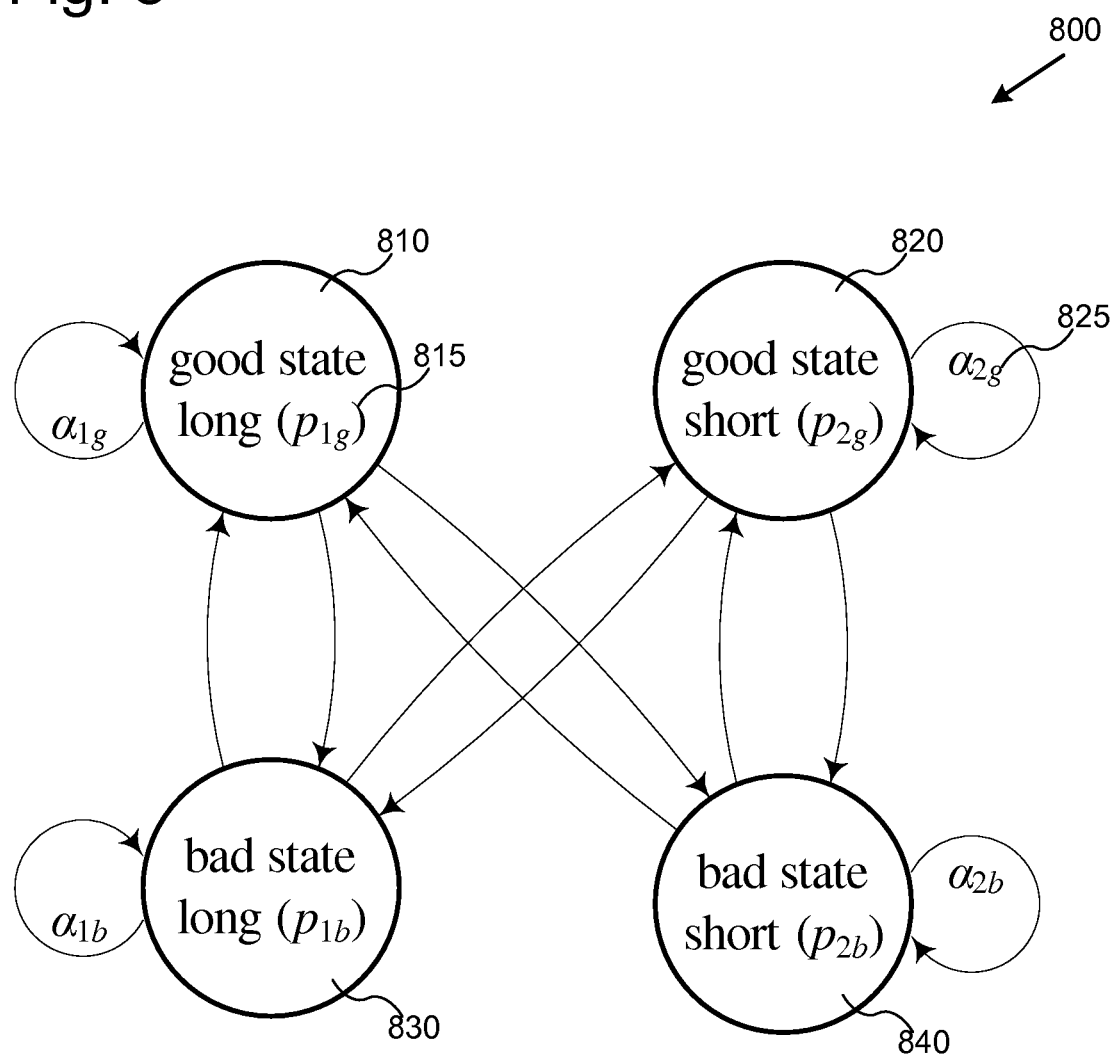
FIG. 8 is a diagram illustrating an example bitstream model.

FIG. 8 illustrates an example of a model used, in one implementation, for MPEG-2 error analysis. The illustrated model comprises a four-state machine, with each state representing the status of the bitstream along two axes: whether the bitstream is currently in a good or bad state, and whether it has been in that state for a relatively long time or a short time. Thus, the machine 800 illustrates a "good state long" state 810, which means that the bitstream is relatively stable and relatively corruption-free. A bitstream which is classified as being in state 830, by contrast, means the bitstream is likely corrupted, and has been that way for a while. This state, or the likelihood of ending up there, as will be discussed below, is a good candidate for adjusting hardware acceleration to a lower level. The states 820 and 840 are similar, respectively, to the states 810 and 830, but when the bitstream has only been "good" or "bad" for a relatively short while.

In one implementation, the determination of good vs. bad is based on the level of corruption of units of the bitstream. For example, correctable errors may not, in a given model, lead automatically to a "bad" state. In various implementations, determination of "long" vs. "short" is based on units in the bitstream which are used in error detection. Thus, for example, a different model, or classification of bitstream state within the model, may vary depending on whether errors are being detected on a deep block-by-block basis or on a lightweight picture-by-picture or packet-by-packet basis, or even at the level of NALUs. In one implementation, where the errors are detected on a picture-by-picture basis, and an error rate of $10^{-7}$-$10^{-6}$ is assumed, then a contiguous error length of <$10^{15}$ pictures is considered to be a "bad short" state. Otherwise, it is considered a "bad long" state. "Good long" and "good short" states can then be defined from these "bad" states. For example, if these assumptions about error rate are based on a sizeable video clip, such as one over 10 minutes long, then these rates can be trustworthy enough to similarly define a "good long" state as one with length $\geq 10^{15}$ pictures and a "good short" state as <$10^{15}$. In another implementation, "short" and "long" states are defined from the probability of having a single bad unit (or picture).

The model also shows eight parameters, such as parameter 815 ($p_{1g}$) or parameter 825 ($\alpha_{2g}$). These represent two types of probabilities which predict transitions within the model. The first type of parameter, such as parameter 815 ($p_{1g}$), indicates, for its associated state, the current probability that the bitstream will be in that state. The second parameter, such as parameter 825 ($\alpha_{2g}$), indicates the probability that the bitstream, once in its associated state, will stay in that state.

At block 720, values for these two types of parameters are computed based on the rate of errors that is occurring as the bitstream is reviewed. Hence, in one implementation, the bitstream is reviewed, and for each unit that is reviewed, the decoder determines a state for the bitstream in the model, and adjusts the probabilities constituting the model parameters accordingly. For example, if the data received from the error detection process is a series of indications of whether each picture has an error or not, the error rate assumptions described above can be used to determine the parameters. While this is a direct way of judging the quality of the bitstream and can be utilized, it may be computationally expensive. For this reason, an alternative implementation, discussed below with respect to FIG. 9, may be used instead. However, the direct computation of model parameters may be used when it does not undesirably slow down decoding.

Finally, at block 730, the software decoder 425 characterizes the bitstream according to the model parameters. For example, in one DXVA implementation, it is desirable to adjust hardware acceleration level when one of the following happens:
1. the probability of "bad long" state is high (indicated by a high $p_{1b}$ value);
2. the probability of entering "bad long" state is high (indicated by low $\alpha_{1g}$ and $\alpha_{2g}$ value); and
3. the probability of staying in "bad long" state is high (indicated by a high $\alpha_{1b}$ value).

Specific implemented values for these probabilities are discussed above. When these conditions are true, the software decoder, at block 730, will categorize the bitstream as being in a poor enough condition that it is desirable to have the level of hardware acceleration dropped, and will indicate that to the adjustment control module 530. Finally, if the process so categorizes the bitstream, then at block 740 it indicates to the adjustment control that the hardware acceleration level is to be dropped. While it is not illustrated for the sake of clarity, in some implementations, a process similar to that of process 700 may be used to determine that the bitstream is in a good enough condition that the level of hardware acceleration may be safely raised. Additionally, while it is not illustrated, the process of blocks 720 and 730 may then repeat for the next statistics prepared by the error detection.

Figure 9:
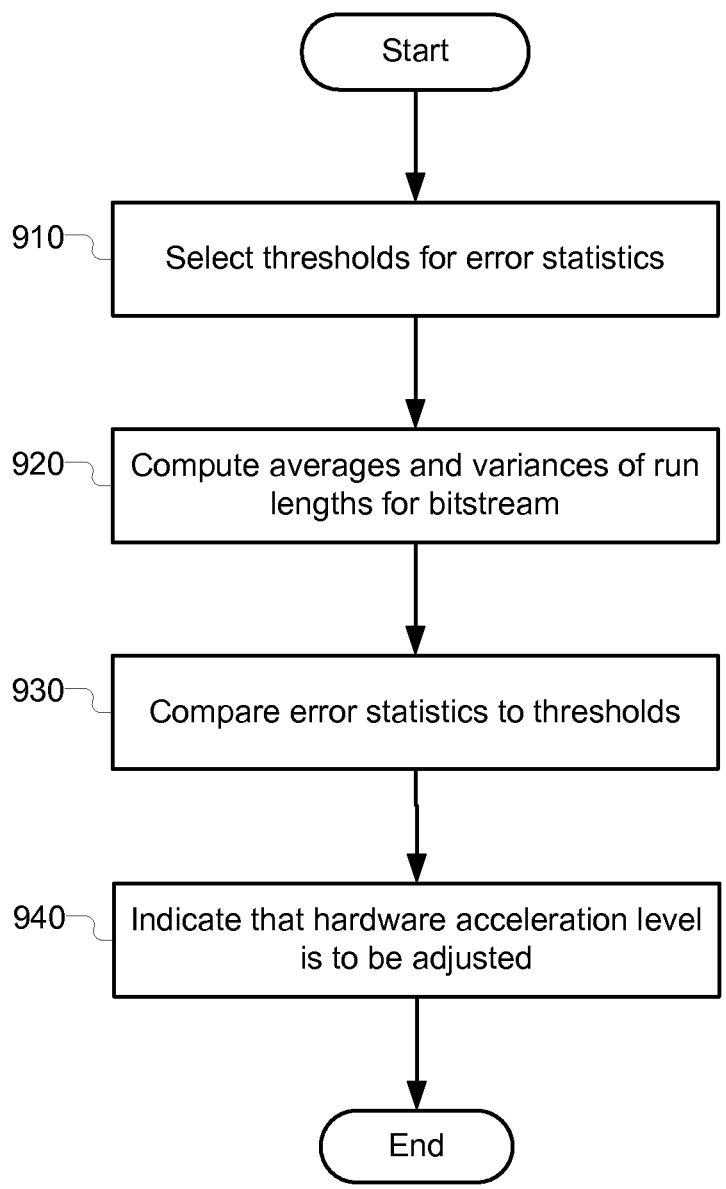
FIG. 9 is a flowchart illustrating an example technique for utilizing error statistics for a video bitstream to determine when hardware acceleration should be adjusted during decoding of the bitstream.

As discussed above, because determining eight constantly-changing model parameters may require more computational power than is desired, an alternative technique for analyzing errors may be used. FIG. 9 is a flowchart of an example process 900 performed by the software decoder 425 for performing statistical error analysis on errors detected using error statistics. In various implementations, subprocesses of the process 900 may be combined or split into additional processes, and may be performed by separate, dedicated software modules or performed by the same modules.

The process of FIG. 9 takes advantage of the fact that, when sufficient data has been collected, the parameters of the four-state model discussed above can be estimated using fewer parameters. In particular, all eight parameters can be derived from six parameters, which are based on variables representing the run-length of good and bad runs of bitstream units, such as pictures. For the purpose of illustration, these variables shall be called $x_g$ and $x_b$. In one implementation, these variables are, in turn, based on a simple binary variable that indicates for each picture (or other unit, if detection is based on different units) whether that picture has an error or not. For the purpose of illustration, that variable shall be called simply x, and will have a value of 1 when it indicates a picture with an error and 0 when it indicates a picture with no errors. Other implementations may utilize or label variables in different ways.

Based on these variables, the three parameters for good run-lengths then comprise: 1) the mean of the good run-lengths $E(x_g)$, 2) the variance of the good run-lengths $var(x_g)$, and 3) the probability of a good unit $P(x=0)$. Similarly, the three parameters for bad run-lengths comprise similar statistics: $E(x_b)$, $var(x_b)$, and $P(x=1)$. In one implementation, these statistics can be based simply on set of data, created during the error detection process, which indicates for each picture whether or not it had an error. Then, the probability of good units can be based on past units by computing a ratio of good units to total units received, while the run-length statistics are based on runs of "good" or "bad" indications for each picture. The statistics for bad units can be computed similarly.

With these six statistical parameters in mind, the relationship between these parameters and the earlier-discussed model parameters can be stated. For example, the relationship between the good parameters is, in one implementation, as follows:

$$E(x_g) = \frac{p_{1g}\alpha_{1g}}{1-\alpha_{1g}} + \frac{(1-p_{1g})\alpha_{2g}}{1-\alpha_{2g}}; \qquad (1)$$

$$var(x_g) = \frac{(1-\alpha_{1g})^2\alpha_{2g} - p_{1g}(1-\alpha_{2g})(\alpha_{2g}-\alpha_{1g})(1+\alpha_{1g}) - p_{1g}^2(\alpha_{2g}-\alpha_{1g})^2}{(1-\alpha_{1g})^2(1-\alpha_{2g})^2}; \qquad (2)$$

and $$P(x=0)=p_{1b}(1-\alpha_{1b})\alpha_{1b}+(1-p_{1b})(1-\alpha_{2b})\alpha_{2b} \qquad (3)$$

Similarly, the relationship between the bad parameters is, in one implementation, as follows:

$$E(x_b) = \frac{p_{1b}\alpha_{1b}}{1-\alpha_{1b}} + \frac{(1-p_{1b})\alpha_{2b}}{1-\alpha_{2b}}; \qquad (4)$$

$$var(x_b) = \frac{(1-\alpha_{1b})^2\alpha_{2b} - p_{1b}(1-\alpha_{2b})(\alpha_{2b}-\alpha_{1b})(1+\alpha_{1b}) - p_{1b}^2(\alpha_{2b}-\alpha_{1b})^2}{(1-\alpha_{1b})^2(1-\alpha_{2b})^2}; \qquad (5)$$

and $$P(x=1)=p_{1g}(1-\alpha_{1g})\alpha_{1g}+(1-p_{1g})(1-\alpha_{2g})\alpha_{2g} \qquad (6)$$

Thus, from these six statistical parameters, all parameters in the four-state model can be solved numerically. However, rather than do that, one implementation of the process directly categorizes the bitstream directly using these six parameters. This means that the three conditions discussed above with respect to process 700 can be simply checked by comparing selected parameters out of the six error statistics to pre-set thresholds. Thus, according to his implementation, the conditions for lowering hardware acceleration level comprise:

1. $E(x_b) > \theta_1$
2. $var(x_b^2) < \theta_2$
3. $E(x_g) < \theta_3$

Where $\theta_1$, $\theta_2$, and $\theta_3$ comprise predetermined thresholds. Thus, process 900 begins at block 910, where the three thresholds are selected. Similarly to the model discussed above, in various implementations, the thresholds may be selected based on various characteristics of the decoding job, including the type of bitstream being decoded, the hardware or software being used, and bandwidth. In some implementations, the thresholds are empirically determined by observing typical errors for similar bitstream. Next, at block 920, the averages and variances for good and bad run-lengths are determined for the bitstream as it is received, by consulting the errors indicated during error detection. The resultant statistical parameters, which are discussed above, are then compared to the thresholds at block 930, where it is determined whether the statistics suggest switching of the hardware acceleration level, such as by the statistics exceeding the threshold values. If the comparison shows a poor bitstream, then at block 940 the process indicates to the adjustment control that the hardware acceleration level is to be dropped. While it is not illustrated for the sake of clarity, in some implementations, a process similar to that of process 900 may be used to determine that the bitstream is in a good enough condition that the level of hardware acceleration may be safely raised. Additionally, while it is not illustrated, the process of blocks 920 and 930 may then repeat for the next statistics prepared by the error detection.

B. Adjustment of Hardware Acceleration Level

Figure 10:
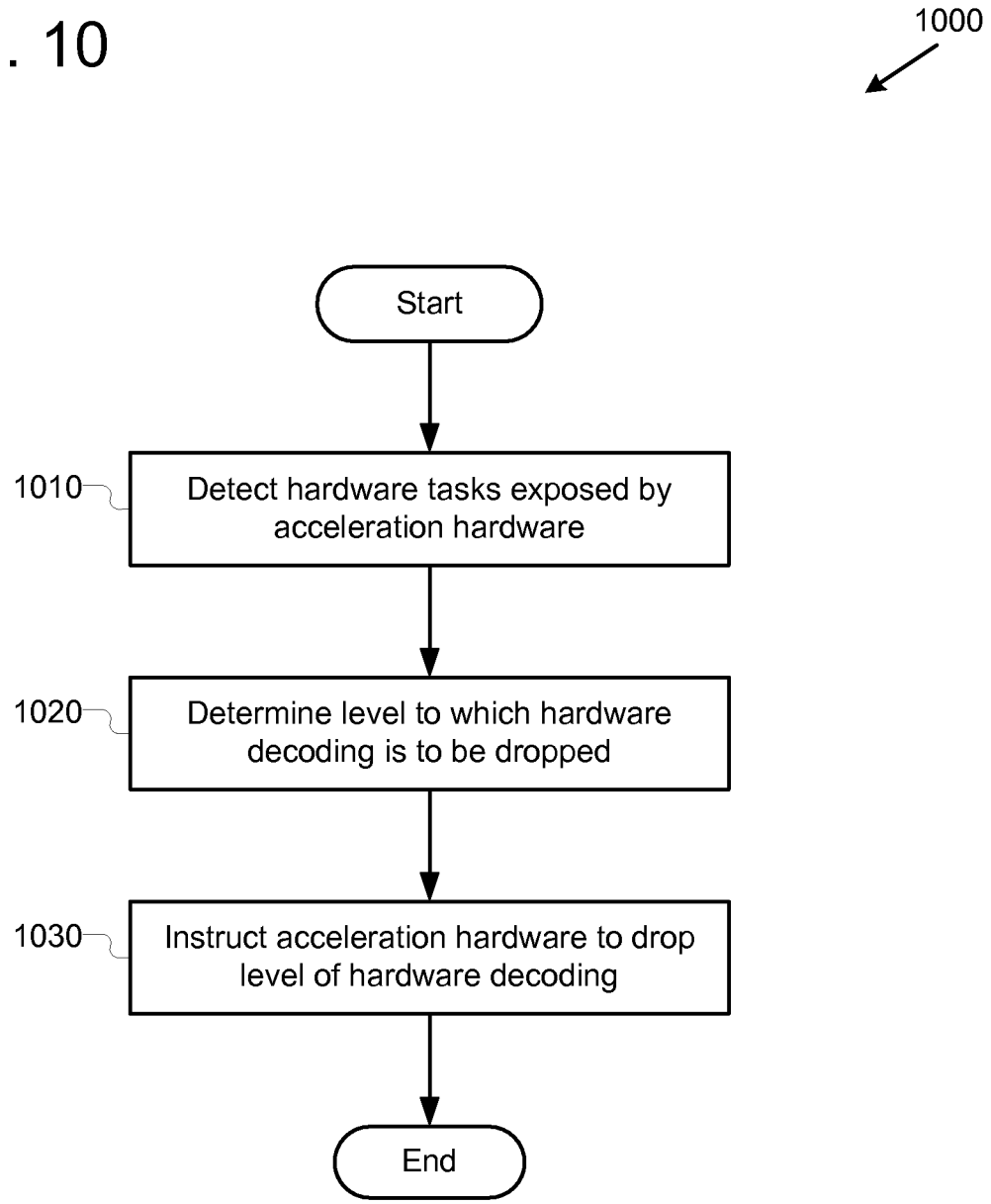
FIG. 10 is a flowchart illustrating an example technique for adjusting a hardware acceleration level based on errors in a video bitstream.

FIG. 10 is a flowchart of an example process 1000 performed by the adjustment control module 530 for adjusting hardware acceleration level. In various implementations, subprocesses of the process 1000 may be combined or split into additional processes, and may be performed by separate, dedicated software modules or performed by the same modules. While the illustrated process 1000 is directed toward dropping the hardware acceleration level, it may be noted that a similar process, not illustrated here, may be performed for raising the hardware acceleration level.

The process begins at block 1010, where the adjustment control detects which hardware tasks are exposed by the acceleration hardware. In some implementations, this is done by requesting information from the acceleration hardware to determine which decoding stages are able to be performed by the hardware. In some the software decoder is hard coded to use only software decoding. In one such implementation, DXVA is completely disabled and the decoder will not check for capability of the hardware acceleration. Next, at block 1020, the software decoder determines the level to which hardware acceleration is to be dropped. This may be based simply on the available levels provided by the hardware, or may be based on additional considerations, such as the types of errors seen during error detection or the processing power available to the software decoder (as it will be taking over tasks currently performed by the hardware). In another implementation, decisions about adjusting hardware acceleration levels is performed based on permissions granted by content protection rules for the video being decoded. Finally, at block 1030, the software decoder instructs the acceleration hardware to drop the level of acceleration, and the process ends. In some circumstances, this instruction may drop all hardware acceleration altogether, in effect switching from hardware-accelerated decoding to software-only decoding. In some implementations, the adjustment control may stop and close a hardware device existing at one level and open a new hardware device at a lower acceleration level to effect the adjustment. In another implementation, the adjustment instructions may be stored before being sent to the hardware acceleration.

V. Extensions

Although many of the innovations described herein are illustrated with reference to examples of MPEG-2 decoding, the innovations are typically applicable to decoding according to other standards such as VC-1 and H.264/AVC, with corresponding changes to syntax elements.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A method for directing video decoding on a computer comprising acceleration hardware for video decoding, the method comprising:
    during decoding of a video bitstream, determining errors in the bitstream;
    performing a statistical analysis of the determined errors in the bitstream, the performing comprising determining error statistics for the bitstream;
    determining, based on the error statistics, that a level at which hardware acceleration is performed should be adjusted; and
    responsive to determining that a level at which hardware acceleration is performed should be adjusted, adjusting the level at which hardware acceleration is performed, wherein adjusting the level at which hardware acceleration is performed comprises:
        switching one or more video decoding stages between performance in the acceleration hardware and performance in software, comprising:
            switching a variable-length video decoding stage from being performed in the acceleration hardware to being performed in software; and
            wherein at least one other video decoding stage is performed in the acceleration hardware before and after the switching.

2. The method of claim 1, wherein determining, based on the error statistics, that a level at which hardware acceleration is performed should be adjusted comprises determining that the bitstream is more corrupt than previously; and
    adjusting the level at which hardware acceleration is performed comprises lowering the level at which hardware acceleration is performed by switching at least one of the one or more video decoding stages to be performed in software instead of in the acceleration hardware.

3. The method of claim 1, wherein determining, based on the error statistics, that a level at which hardware acceleration is performed should be adjusted comprises determining that the bitstream is less corrupt than previously; and
    adjusting the level at which hardware acceleration is performed comprises raising the level at which hardware acceleration is performed by switching at least one of the one or more video decoding stages to be performed in the acceleration hardware instead of in software.

4. The method of claim 1, wherein, before adjusting, the level at which hardware acceleration is performed is set such that the variable-length video decoding stage is performed in hardware; and
    determining errors in the bitstream comprises performing a lightweight review which identifies errors other than those found in discrete cosine transform coefficients, wherein performing the lightweight review comprises reviewing headers and reviewing for packet loss.

5. The method of claim 1, wherein performing a statistical analysis of the determined errors comprises updating error statistics repeatedly as the bitstream is received.

6. The method of claim 5, wherein the error statistics comprise average and variance values for run-length values of good and bad runs in the bitstream.

7. The method of claim 6, wherein determining, based on the error statistics, that a level at which hardware acceleration is performed should be adjusted comprises determining that long corrupted runs are more likely.

8. The method of claim 6, wherein determining, based on the error statistics, that a level at which hardware acceleration is performed should be adjusted comprises comparing values out of the average and variance values to predetermined threshold values.

9. The method of claim 8, wherein the predetermined threshold values are based on the type of bitstream being decoded.

10. The method of claim 8, wherein the predetermined threshold values are based on empirical observations of bitstream errors.

11. The method of claim 1, wherein:
    the acceleration hardware provides data which indicate which decoding levels can be performed by the acceleration hardware; and
    adjusting the level at which hardware acceleration is performed comprises adjusting between levels indicated by the data provided by the acceleration hardware.

12. The method of claim 1, the method further comprising:
    categorizing the bitstream as fitting a state of an error model, the categorizing being based on the statistical analysis of the determined errors in the bitstream.

13. The method of claim 12, wherein the error model comprises states based on whether the bitstream is corrupted or is correct, and the length of time for which the bitstream has been corrupted or is correct.

14. The method of claim 13, wherein categorizing the bitstream as fitting a state of an error model comprises determining that the bitstream is likely to be in a state corresponding to a long, corrupt run.

15. The method of claim 12, wherein the error model comprises transitions between states which are based on probabilities of staying in or leaving the states.

16. The method of claim 15, wherein the probabilities can be determined from error statistics developed from the statistical analysis of the determined errors in the bitstream.

17. The method of claim 16, wherein the error statistics comprise averages and variances for lengths of good and bad runs in the bitstream, and wherein adjusting the level at which hardware acceleration is performed comprises indicating that one or more video decoding stages being performed in the acceleration hardware are to be switched to being performed in software when chosen values out of the averages and variances pass predetermined thresholds.

18. One or more computer-readable memory or storage devices storing computer-executable instructions which, when executed by a computer cause the computer to perform a method, the method comprising:
- during decoding of a video bitstream, determining errors in the bitstream;
- performing a statistical analysis of the determined errors in the bitstream, the performing comprising determining error statistics for the bitstream;
- determining, based on the error statistics, that a level at which hardware acceleration is performed should be adjusted; and
- responsive to determining that a level at which hardware acceleration is performed should be adjusted, adjusting the level at which hardware acceleration is performed, wherein adjusting the level at which hardware acceleration is performed comprises:
  - switching one or more video decoding stages between performance in acceleration hardware and performance in software, comprising:
    - switching a variable-length video decoding stage from being performed in the acceleration hardware to being performed in software; and
    - wherein at least one other video decoding stage is performed in the acceleration hardware before and after the switching.

19. A computing device comprising:
- a central processing unit; and
- a video hardware acceleration unit;
- the computing device configured to perform a method for directing video decoding, the method comprising:
  - during decoding of a video bitstream, determining errors in the bitstream;
  - performing a statistical analysis of the determined errors in the bitstream, the performing comprising determining error statistics for the bitstream;
  - determining, based on the error statistics, that a level at which hardware acceleration is performed should be adjusted; and
  - responsive to determining that a level at which hardware acceleration is performed should be adjusted, adjusting the level at which hardware acceleration is performed, wherein adjusting the level at which hardware acceleration is performed comprises:
  - switching one or more video decoding stages between performance in the video hardware acceleration unit and performance in software, comprising:
    - switching a variable-length video decoding stage from being performed in the acceleration hardware to being performed in software; and
    - wherein at least one other video decoding stage is performed in the acceleration hardware before and after the switching.

* * * * *